United States Patent [19]
Gay et al.

[11] Patent Number: 6,145,583
[45] Date of Patent: Nov. 14, 2000

[54] INSPECTION DEVICE

[75] Inventors: John M. Gay, Pittsford; Terry M. Radigan, Scottsville; Gregory J. Yadzinski; William J. Harris, both of Walworth; Cedric G. Chang, Webster, all of N.Y.; Donald R. Lefebvre, San Diego, Calif.

[73] Assignee: R. Brooks Associates, Inc., Williamson, N.Y.

[21] Appl. No.: 08/874,139

[22] Filed: Jun. 13, 1997

Related U.S. Application Data

[60] Provisional application No. 60/019,784, Jun. 14, 1996.

[51] Int. Cl.[7] .................................................... G21C 17/00
[52] U.S. Cl. ........................... 165/11.2; 165/95; 376/245; 376/248; 376/249; 122/392
[58] Field of Search .................... 165/11.2, 95; 376/245, 376/248, 249; 122/392

[56] References Cited

U.S. PATENT DOCUMENTS

| 4,827,953 | 5/1989 | Lee | 165/95 |
|---|---|---|---|
| 5,069,172 | 12/1991 | Shirey et al. | |
| 5,117,897 | 6/1992 | Robert | 165/11.2 |
| 5,265,129 | 11/1993 | Brooks et al. | 376/245 |
| 5,467,813 | 11/1995 | Vermaat | 165/11.2 |
| 5,504,788 | 4/1996 | Brooks et al. | 376/248 |
| 5,544,206 | 8/1996 | Brooks et al. | 376/248 |
| 5,564,371 | 10/1996 | Ashton et al. | 122/392 |

FOREIGN PATENT DOCUMENTS

WO 95/30861  1/1995  WIPO .

OTHER PUBLICATIONS

Patent Abstracts of Japan, vol. 97, No. 8 and JP 09–090084A, Apr. 4, 1997.

*Primary Examiner*—John K. Ford
*Attorney, Agent, or Firm*—Stephen B. Salai, Esq.; Brian B. Shaw, Esq.; Harter, Secrest & Emery LLP

[57] ABSTRACT

A device for inspecting the interior of steam generators capable of visually inspecting interior of tubes in steam generators, including upper portions steam generator tubes, tops and bottoms of support plates, wrapper-to-support plate welds, and other internal structures.

23 Claims, 17 Drawing Sheets

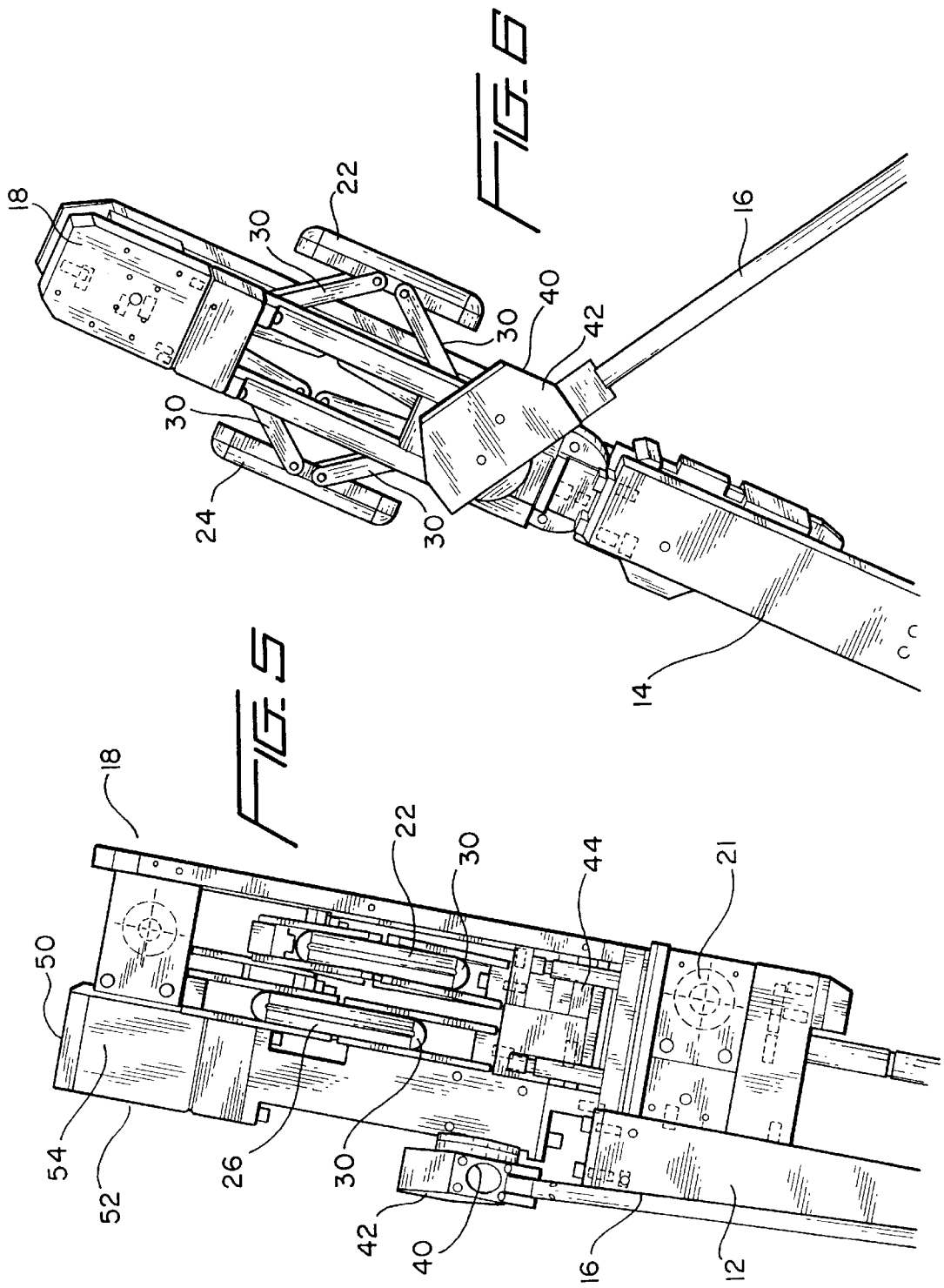

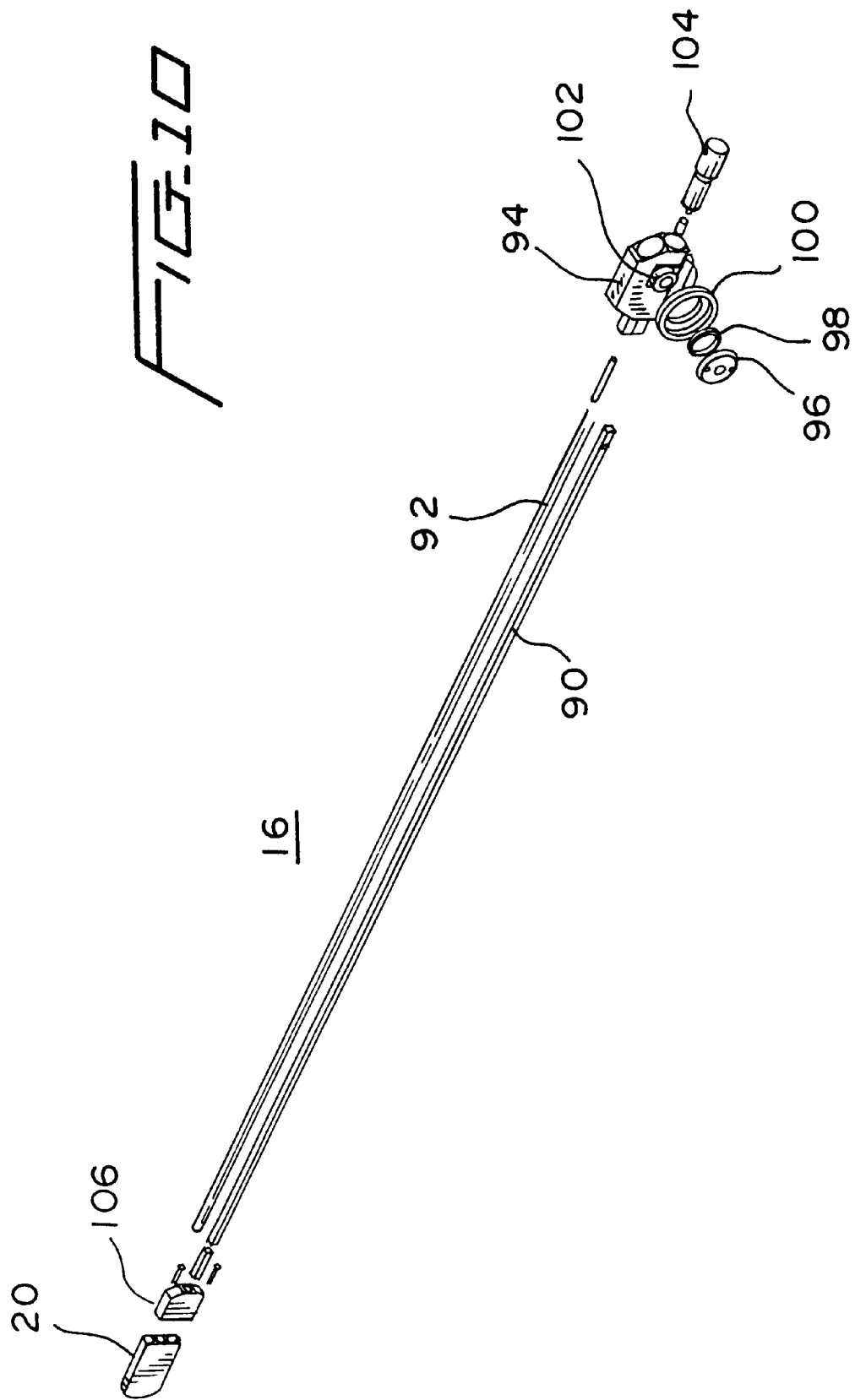

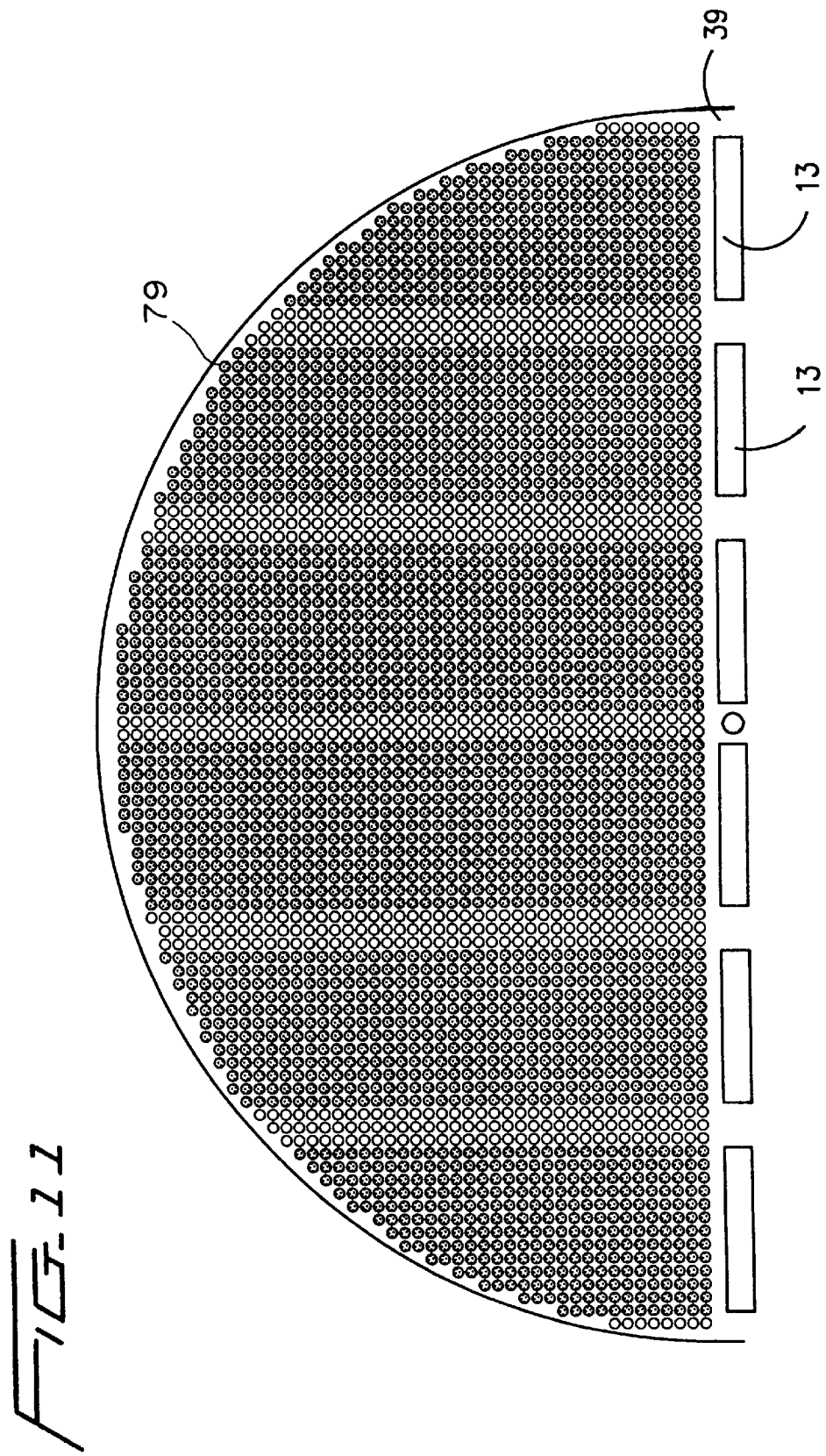

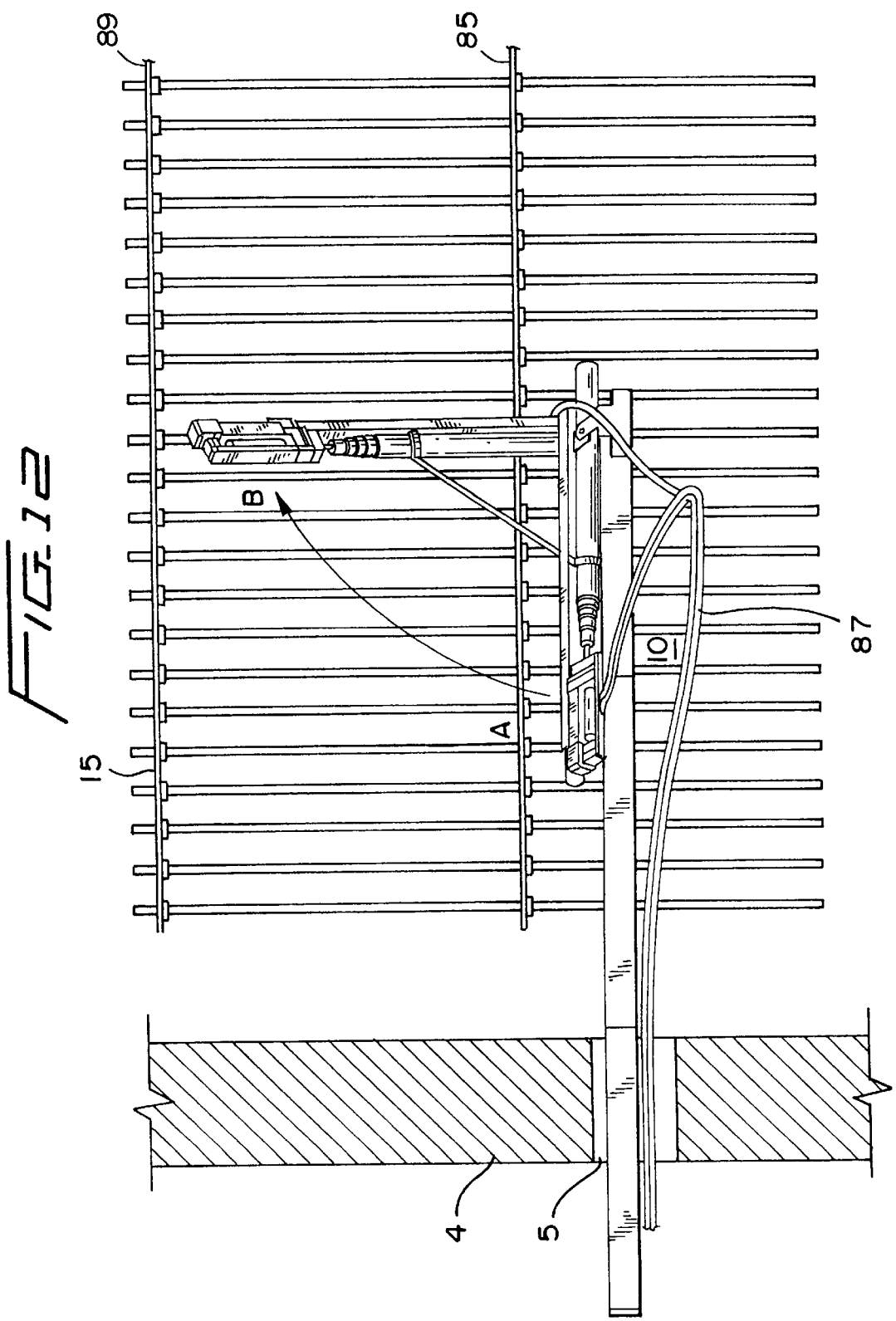

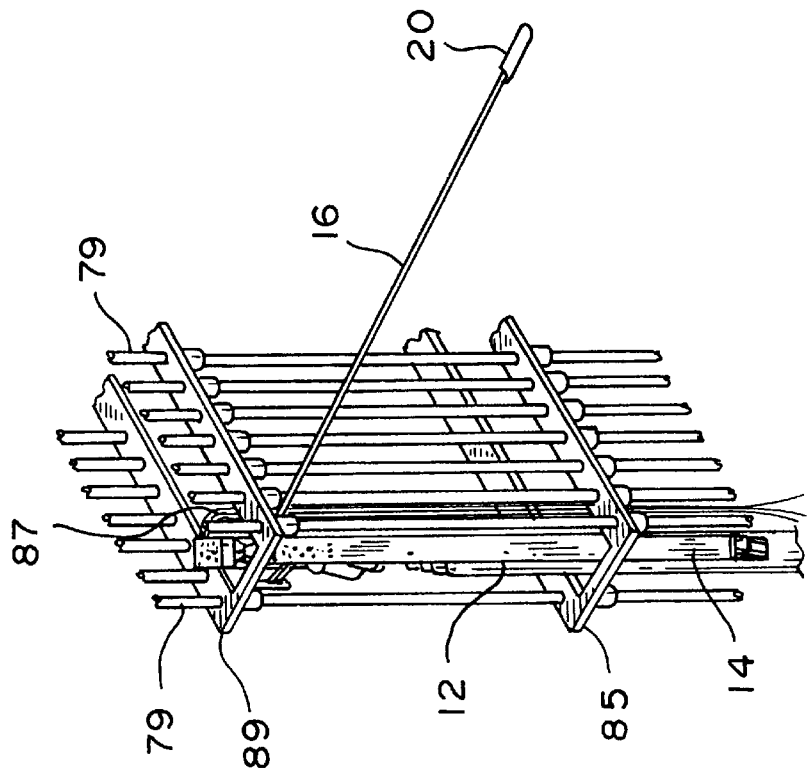
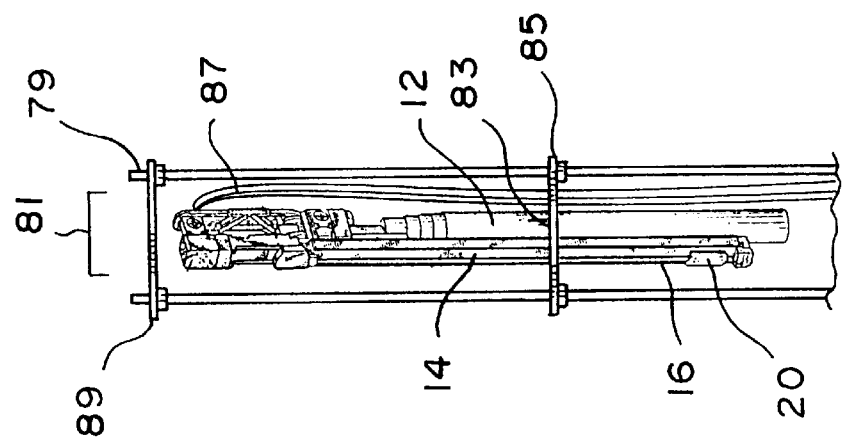

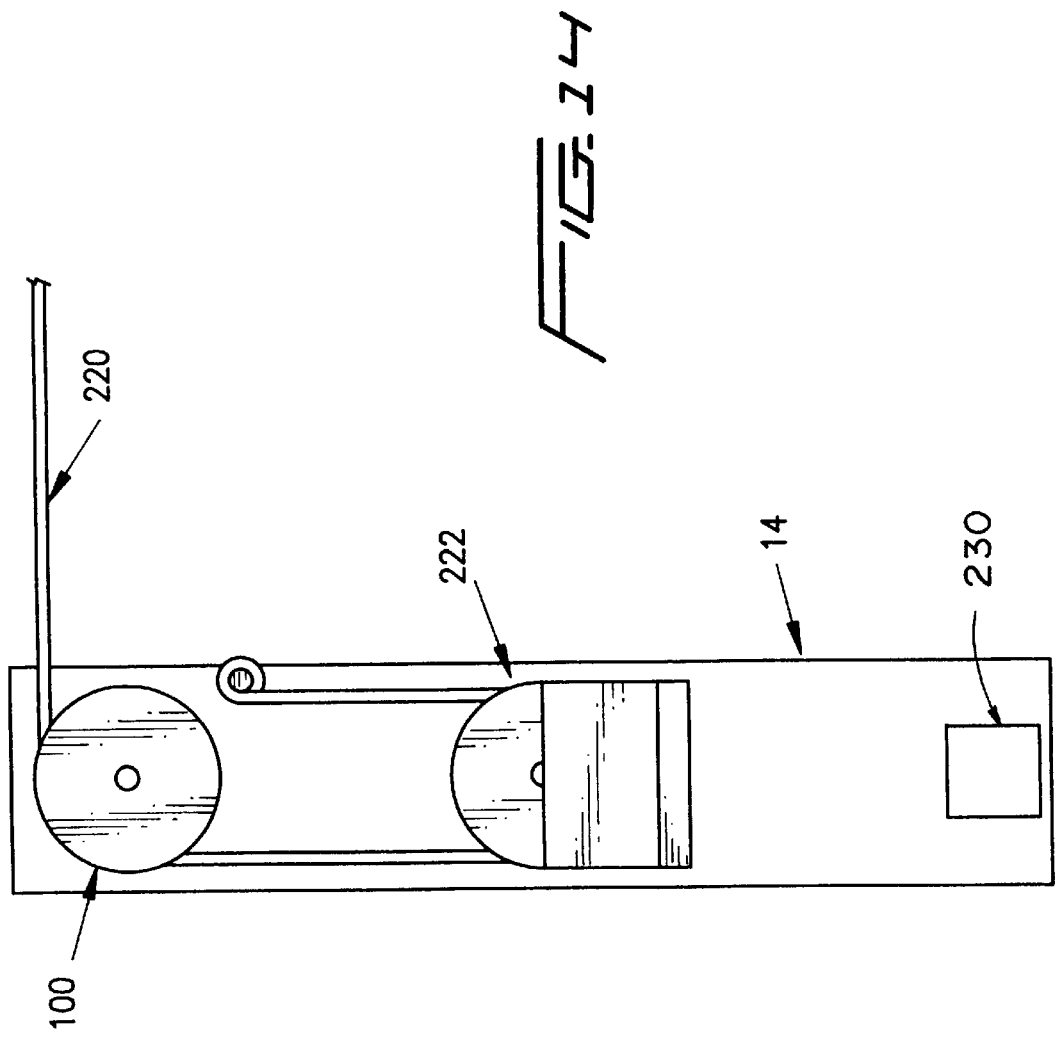

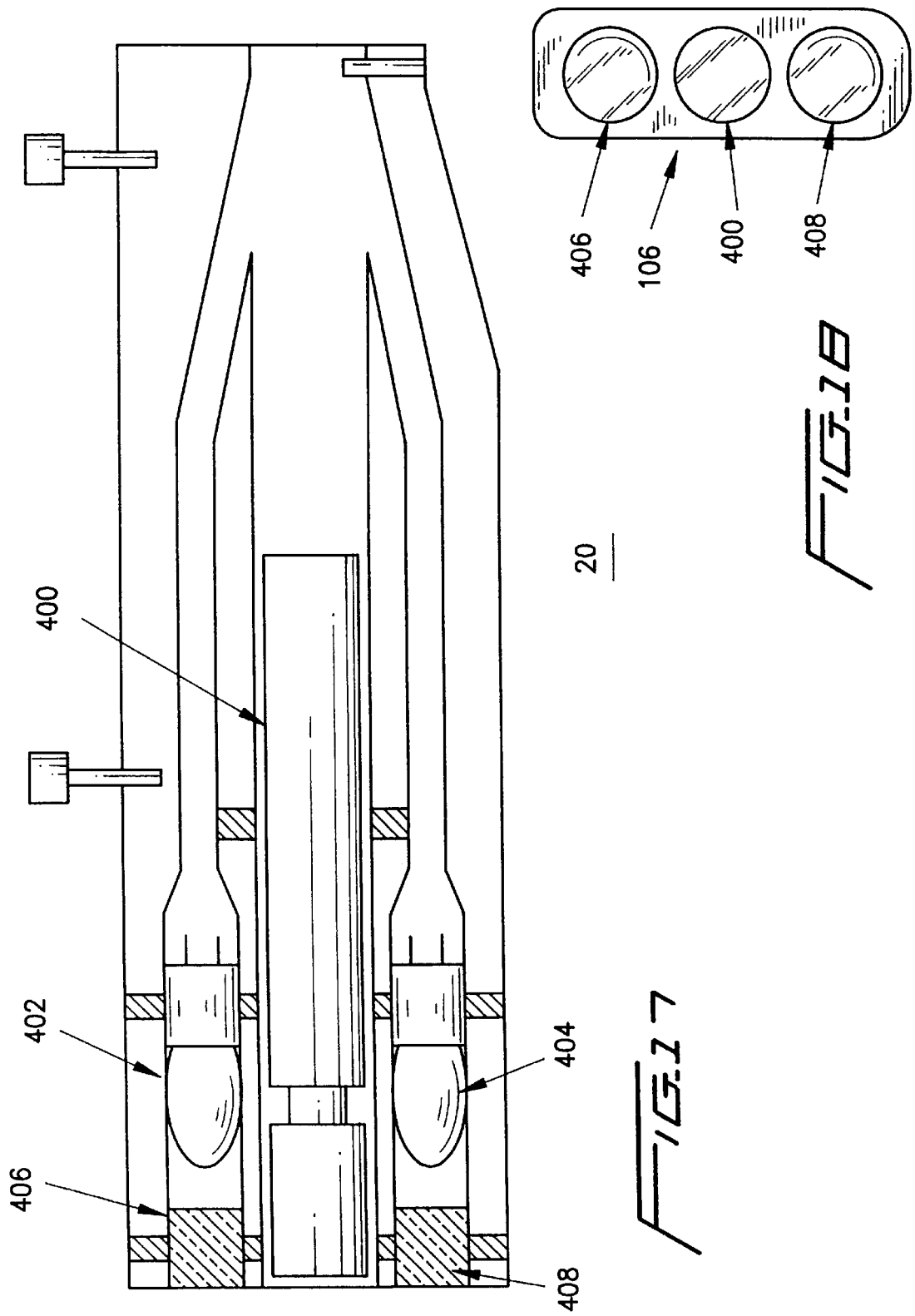

INSPECTION DEVICE

This application claims benefit to U.S. provisional Ser. No. 60/019,784 filed Jun. 14, 1996.

FIELD OF THE INVENTION

The present invention relates to the field of inspection devices generally, and more specifically to nuclear power plant steam generator inspection devices.

BACKGROUND OF THE INVENTION

In a nuclear reactor power plant, a nuclear reactor vessel is used to generate heat for the production of steam and electricity. The reactor vessel is typically a pressurized vessel enclosing a core of nuclear fuel and cooling water. Such nuclear power plants typically contain three major components: a 1) reactor which produces superheated water which is transported to one or more 2) steam generators, and a 3) power turbine, driven by steam which generates electric power.

The superheated water is transported to the steam generator by pipes. These pipes feed the water into numerous tubes within the steam generator. These tubes are U-shaped, feeding the water back to the pipes at the outlet of the steam generator to be recirculated back to the reactor. The tubes in a nuclear steam generator typically form an inverted "U" separated by a lane, and held together by a plurality of support plates, separated at periodic vertical intervals. The height of each tube row may exceed thirty-two feet. Six to eight or more support plates are used, each separated vertically at three to six foot intervals. In the steam generator, the tube carrying the superheated water are quenched with cool water, which generates the steam which drives the turbine to produce electricity.

This procedure for generating steam presents several problems. The water used to quench the tubes often has impurities and chemicals which may corrode both the steam generator tubes and the support plates and lead to other damage. Even though periodic inspections of nuclear steam generators are required for compliance with safety regulations, monitoring steam generator cleanliness remains a problem. The highly corrosive environment of the steam generator is particularly problematic for many of the older nuclear reactors in service throughout the world.

In the past, steam generator tubes and support plates were inaccessible for visual inspection. Information was gathered by complicated systems which could not adequately inspect all sections of tubes and support plates. Because of the highly radioactive environment and the heat of the pipes, direct visual human inspection has typically been restricted to between three and five minutes per man per six month period. This time period does not provide ample opportunity for the careful inspection for corrosion, holes and leaks. It is therefore difficult to inspect within the narrow lanes and tube separation gaps at the support plates, because of the heat, radioactivity and narrowness of the lanes separating the tubes.

Commonly assigned U.S. Pat. No. 5,265,129, the entire contents of which are incorporated by reference herein as though made part of the present specification, discloses an improved apparatus and method for inspecting steam generators, especially inspecting within the lanes located between the tubes. However, even this improvement does not afford an operator an unrestricted view of the entire contents of the steam generator.

Tubes typically extend through support plates at quatrefoil holes. These openings provide flow through features to improve water flow in the generator and to reduce the build-up of sediment at the support plates. Nevertheless, the small areas where the quatrefoil opening must contact the tube results in areas of material build-up on the tubes, or even adherence of material being "plated out" on the tubes. This material will contribute to premature corrosion of the tubes. With known inspection devices, this condition will go undetected on all but the tubes bordering the lane.

Further, the orientation of component parts within steam generators provides extreme challenges to designing workable devices for inspecting such areas. Insertion holes (also known as hand holes) at the bottom of the steam generators are often as small as a five or six inch diameter. For the purpose of this application such portals will be referred to inclusively as access ports. Flow distribution baffles within the generator often obstruct any room to maneuver equipment within the generator. Inspection within steam generators at elevations as high as thirty feet or more provide significant engineering challenges. In addition, the flow slots between tube rows are often less than two inches wide and tube separation gap dimensions are often less than one inch (down to about 0.30 inches). A device which could enable the visual inspection of many areas within the steam generator, including between tubes, over and under all support plates between the top of the support plate above the hand hole and the bottom of the top most support plate, etc. would be highly useful.

SUMMARY OF THE INVENTION

The present invention is directed to an inspection device that is capable of visually inspecting tube regions in steam generators, including upper portions of steam generator tubes, tops and bottoms of support plates, wrapper-to-support plate welds, and other internal structures.

Further, the present invention is directed to a device for inspecting areas of the steam generator and identifying areas for targeted cleaning, by use of a fully automated computer assisted and remotely controlled inspection robot.

Still further, the present invention is directed to a device for inspecting the interior of a steam generator comprising a first boom, a second boom having a first end pivotally attached to the first boom and a second end, a head assembly attached to the second end, a plurality of registration guides attached to the head assembly and having a means for moving the guides from a first retracted position to a second extended position and a movable sensing wand attached to a drive mechanism in the head assembly at a proximal end and having a sensor at a distal end.

In one preferred embodiment, the first boom is a rail assembly, the second boom is a telescoping boom, the sensing wand is a telescoping wand, and the sensor is a camera.

In addition, the present invention provides a method for inspecting the interior of a steam generator comprising providing an inspection device comprising a first boom, a second boom having a first end pivotally attached to the first boom and a second end, a head assembly attached to the second end, a plurality of registration guides attached to the head assembly, and a movable sensing wand attached to a drive mechanism in the head assembly at a proximal end and having a sensor at a distal end. The inspection device is inserted through an access port in the generator. The first boom is then positioned in the tube lane between and perpendicular to the center most tube rows. The second boom then is uprighted within the generator to a vertical position generally parallel to the tubes. The device is then located at a predetermined location. The registration guides are actuated to be extended against opposing tubes across the tube lane. The wand is then actuated to position the sensor at a desired location. The sensor then records and displays visual images at a display located remotely from the device.

BRIEF DESCRIPTION OF THE DRAWINGS

FIG. 5 is an enlarged front view of the head assembly of the present invention.

FIG. 6 is an enlarged right side view of the head assembly of the present invention.

FIG. 10 is a perspective view of the wand assembly of the present invention.

FIG. 11 is a cross-sectional top plan view of the left half of a steam generator.

FIG. 12 is a perspective view of the present invention inserted into a steam generator showing initial retracted and deployed positions.

FIG. 13a is a sectional view of the invention in position in the tube lane of a steam generator.

FIG. 13b is a sectional perspective view of the invention in the tube lane with the wand deployed into a tube column.

FIG. 14 is a partial cross-sectional view of the cable housing.

FIG. 17 is a cross-sectional view of the probe housing the camera.

FIG. 18 is an end view of the probe showing the camera and light assembly placement.

DETAILED DESCRIPTION OF THE INVENTION

Figure 1:
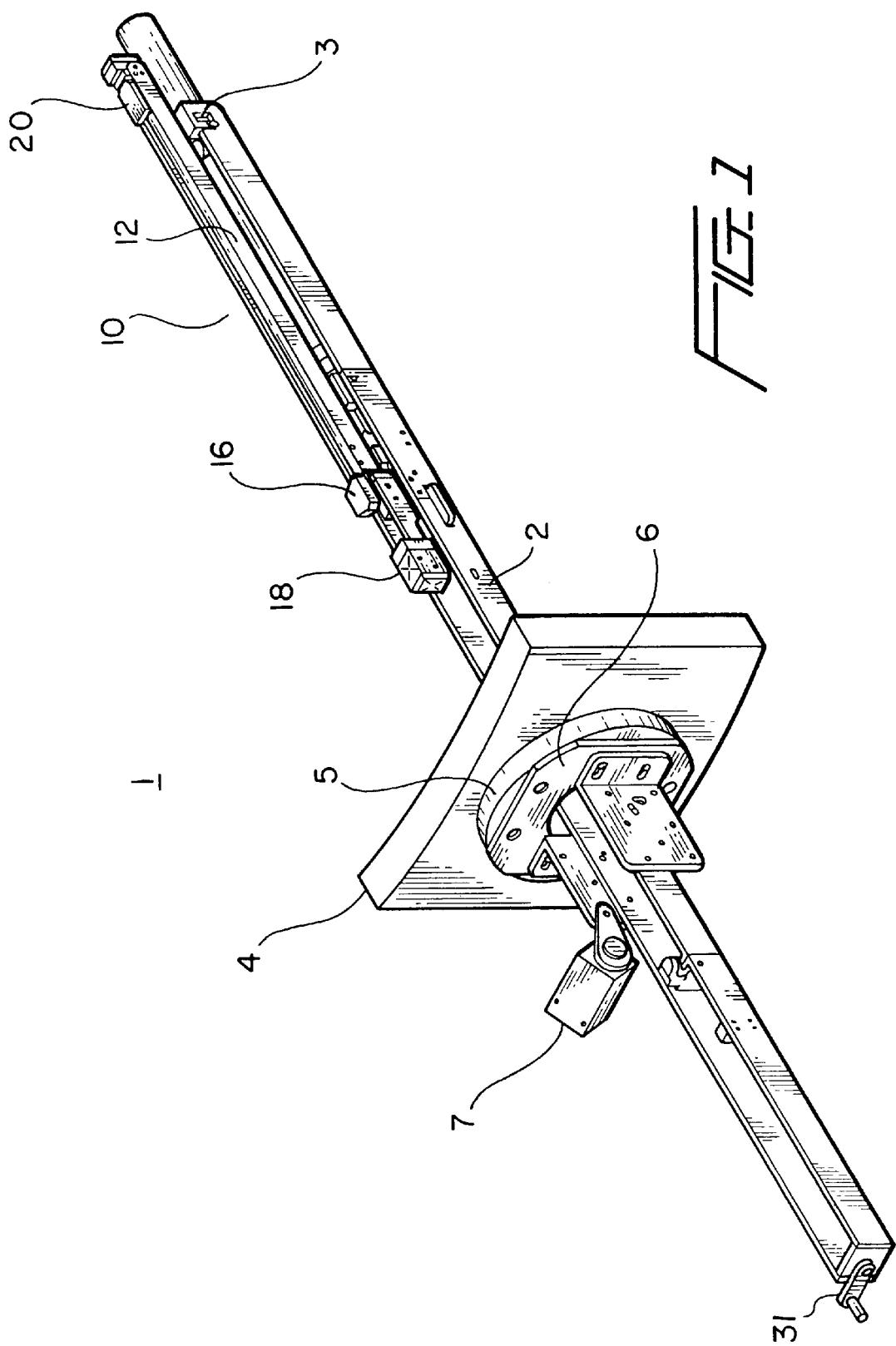
FIG. 1 is a perspective view of the present invention deployed horizontally through the generator access port.
Figure 2:
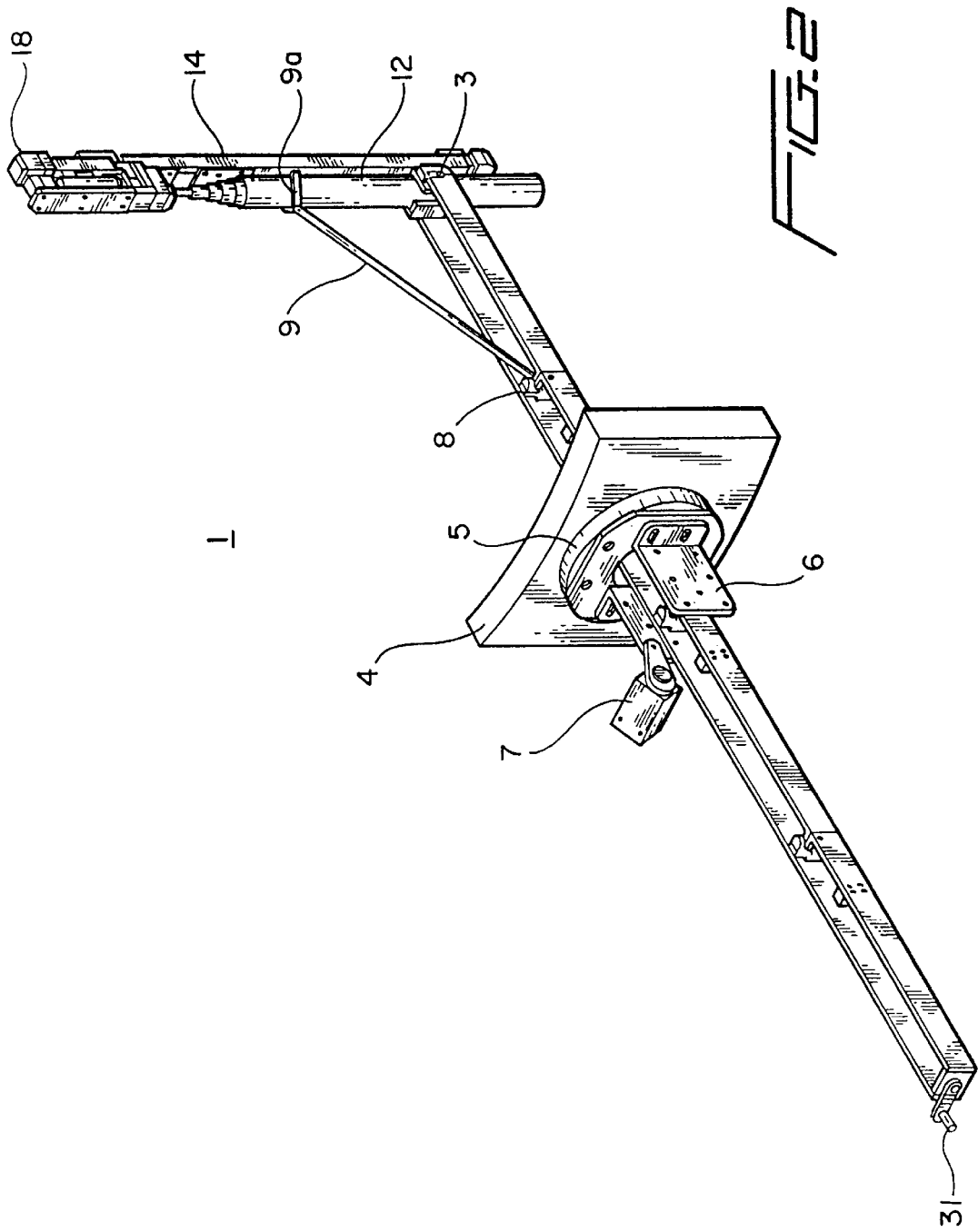
FIG. 2 is a perspective view of the present invention deployed vertically within the generator.

The present invention positions an inspection head into a flanged access port having a diameter of about six inches near the bottom of a steam generator. The device is mounted on a specially designed rail-like adapter to facilitate entry through a small opening. The device, designed for a vertical lift of about 30 feet or more, first extends horizontally into the steam generator through the flanged access port. The device rests near the base of the steam generator in the region known as the tube lane. The tube lane is the narrow area created by the innermost inverted U-tubes. Steam enters one side of the U-bend (the hot pipe). and travels around the U-bend of the pipe and is quenched by the cool water in the steam generator and proceeds around to the other side of the U-bend (the cool pipe). Once the tool is installed horizontally, it is raised to a vertical position through a flow slot in the support plates in the generator. The rail assembly is moved in or out as the tool is raised to keep the head aligned with the flow slot in each support plate. Support plates occur vertically throughout the height of the generator at three to six foot intervals. The device is then maneuvered into a vertical position through use manual cranking.

The hydraulically-controlled telescoping assembly is then activated allowing the device to extend vertically to the desired height which may cause the device to proceed through the flow slots of successive support plates. Computer-controlled or manually controlled machinery extends the telescoping section to the height to be sensitively and accurately measured to assure an operator of the precise vertical location of the device head within the steam generator.

Once the device is in the vertical position, the horizontal position location is verified visually and numerically by determining at which tube column the device is located. This is accomplished by mechanical distancing apparatuses, such as pulleys or gears, or may be done by using position sensors such as, for example, pattern recognition sensors, etc. A registration apparatus is then preferably pneumatically powered to extend sets of registration guides (which are finger-like projections) from a retracted position at rest. When each guide set is extended, one guide will contact the hot tube and one guide will contact the cool tube of the same U-tube.

The probe camera at the end of an inspection wand is then raised, preferably by remote computer control of a direct motor drive, into the desired inspection position between specified tube columns. As the device is telescopically raised or lowered vertically, an upward facing head camera mounted in the top of the inspection head gives a view of the first tube row and the flowslot or lane. Preferably, the head of the device located atop the vertically telescoping section contains an additional camera or sensor facing the center of the generator to provide additional information on device location and generator condition. The device is therefore able to inspect both the top and bottom of tube support plates as well as the wrapper welds at the support plates, and other internal structures FIGS. 1–7 show one preferred embodiment of the present invention. Inspection device 1 comprises a telescoping boom assembly 12 with head assembly 18 attached. One (proximal) end of sensing wand 16 attaches to head assembly 18. The other (distal) end of the wand houses probe 20 which houses a camera and light assembly See FIGS. 17 and 18. First boom rail assembly 2 attaches to telescoping boom 12 at uprighting pivot clamp 3. The generator wall 4 has access port 5 to which access port mounting plate 6 attaches. Rack drive servo motor 7 attaches to mounting plate 6. Manual crank handle 31 drives gear 8 which is attached to rod 9. Rod 9 attaches to clamp 9a which is secured about telescoping boom 12. Manual crank handle 31 can be operated to deploy the second telescoping boom 12 and to retract telescoping boom 12 to the retracted position. Cable housing 14 attaches to head 18. Quick release feature 21 (FIG. 5) removably secures assembly 12 to head assembly 18. Registration guides 22, 24, 26, 28 are shown. See FIGS. 5–7. One end of registration links 30 attach to guides. The other end of the links 30 attach to the air cylinder attachment block 62 of air cylinder base 60. See FIG. 9.

Figure 3:
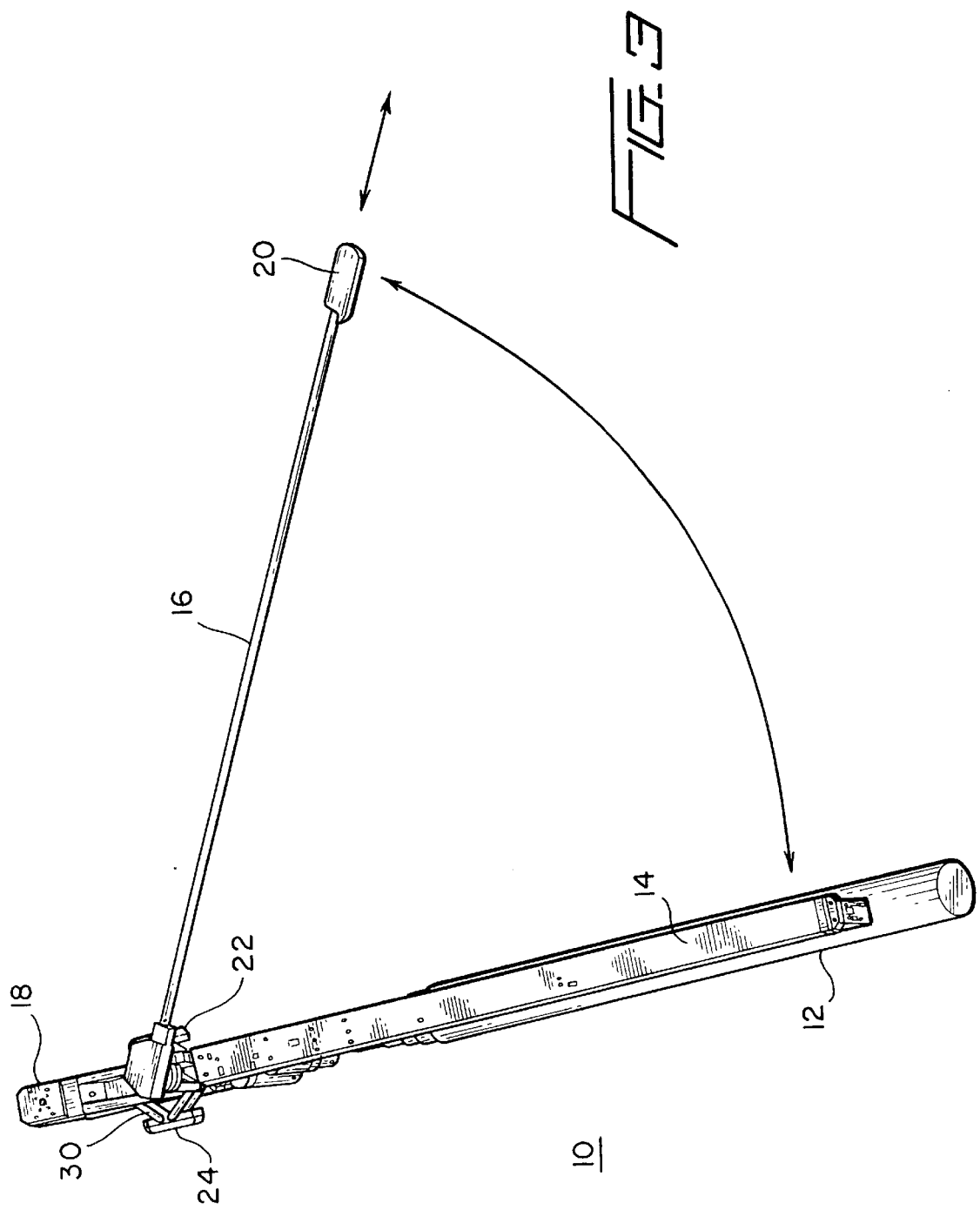
FIG. 3 is a perspective view of the present invention with wand deployed.
Figure 4:
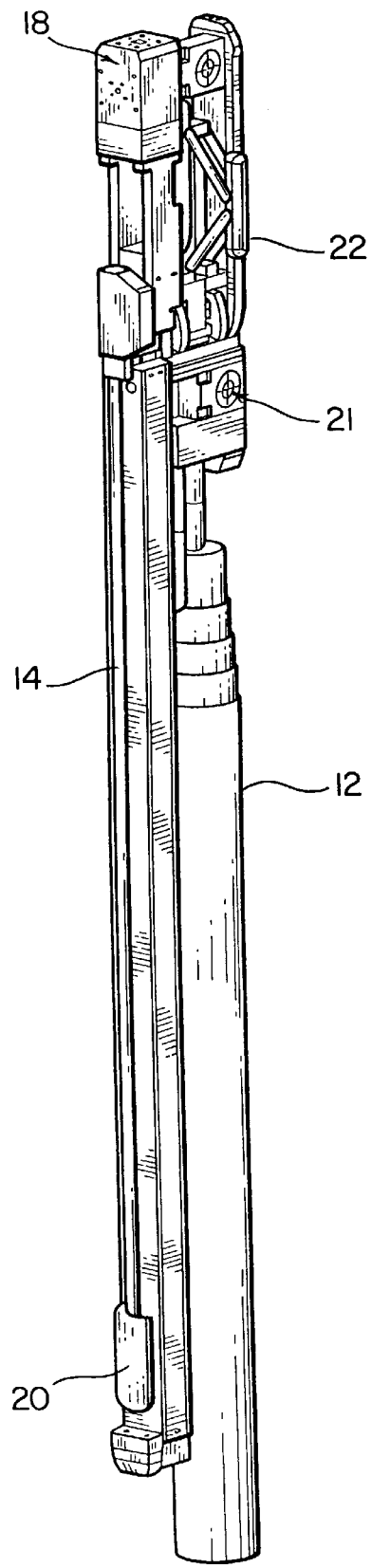
FIG. 4 is a perspective view of the present invention with wand retracted.
Figure 7:
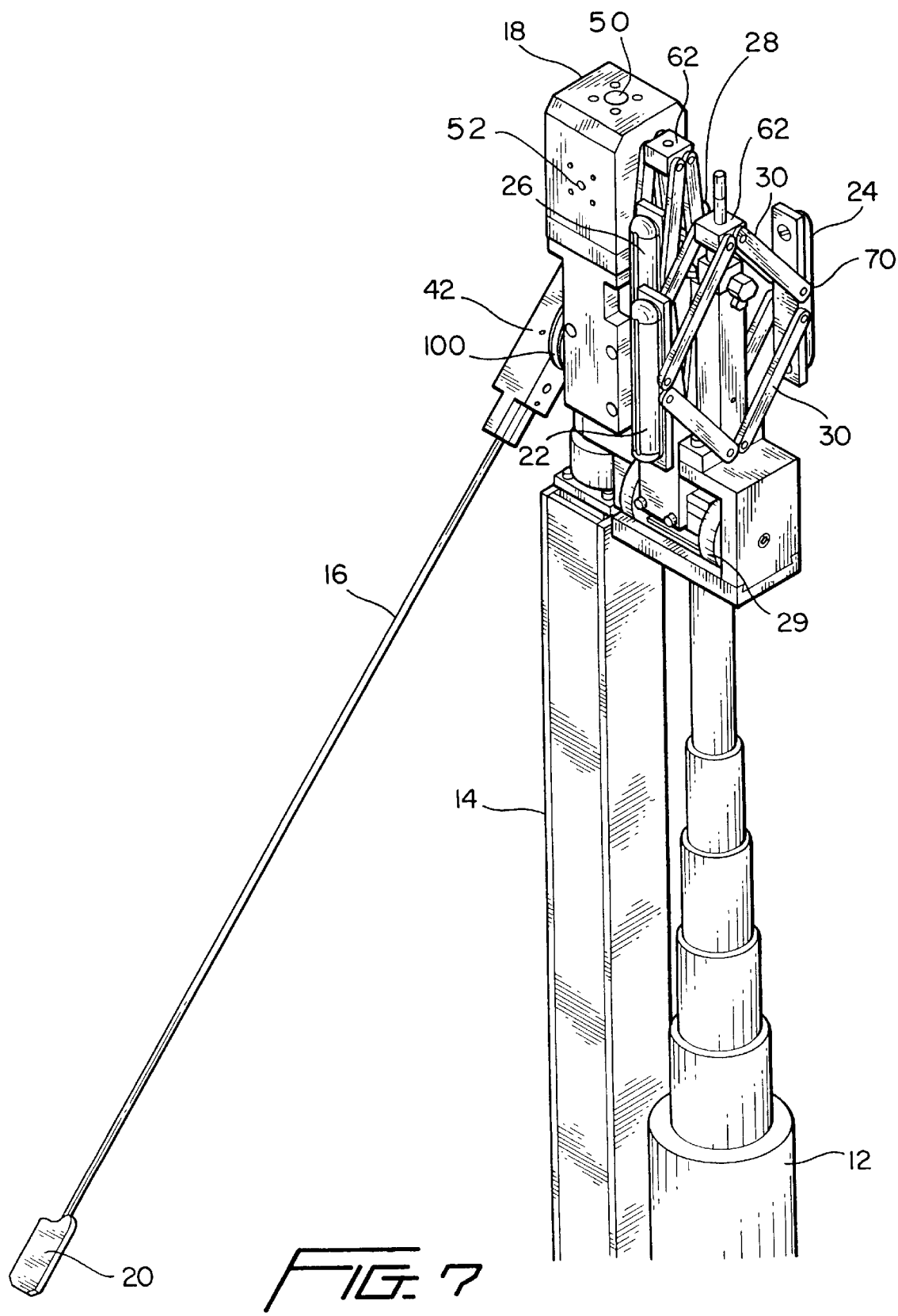
FIG. 7 is a perspective left side view of the present invention
Figure 8:
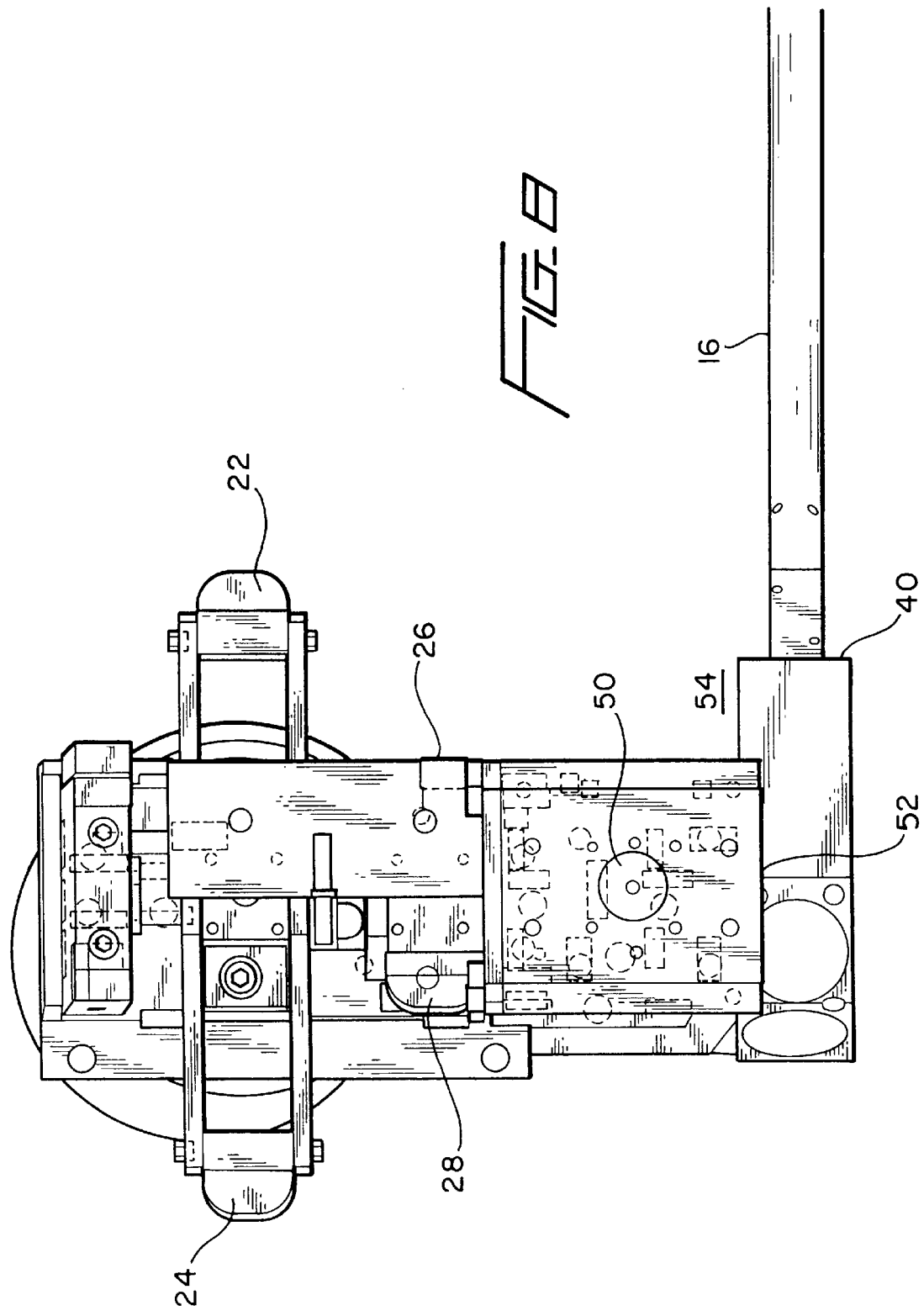
FIG. 8 is a top plan view of the present invention.

FIG. 3 shows the wand 16 in a deployed position. FIG. 4 shows wand 16 in a starting/retracted position. FIGS. 5–7 show an additional camera 40 in housing 42 at the proximal end of wand 16. Further top head camera 50 and side head camera 52 are positioned at the top housing 54 of head assembly 18. Air cylinder 44 provides pneumatic pressure to the registration guides. FIG. 8 shows a top view of one preferred embodiment of the present invention. Camera 40 positioned at the proximal end of wand 16 is shown along with side head camera 52, top head camera 50. Registration guides 26 and 28 are shown in their retracted position while guides 22 and 24 are shown extended.

Figure 9:
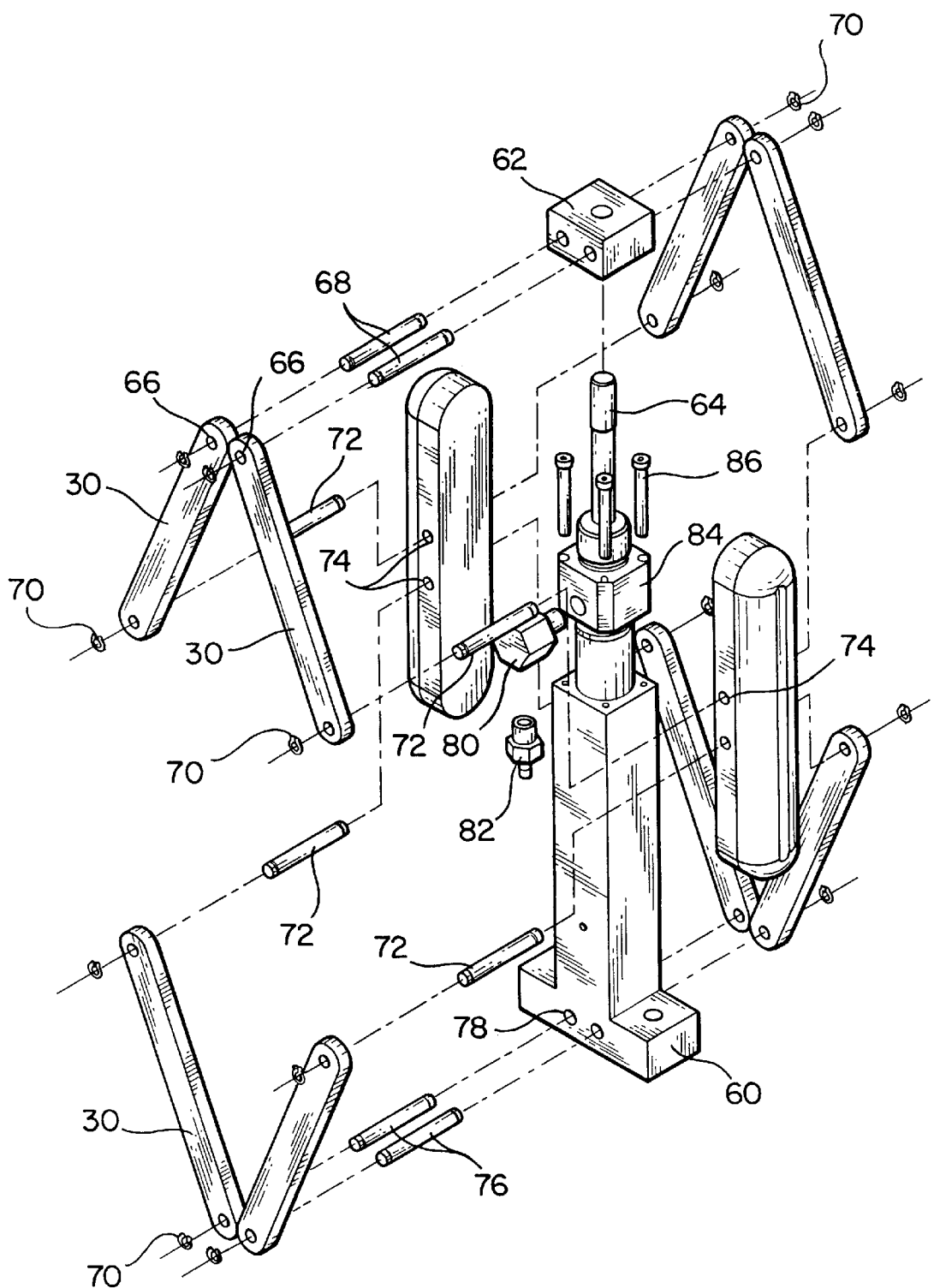
FIG. 9 is an exploded view of the registration assembly of the present invention.

FIG. 9 shows an exploded view of the registration assembly. Air cylinder base 60 has driver block 62 fit over top post 64. Registration links 30 have through holes 66, through which link pins 68 extend and secure in driver block 62. Retainer caps 70 affix to link pins 68. Link pins 72 pass through links 30 and secure in guide openings 74. Link pins 76 pass through links 30 at openings 66 and secure in openings 78 in base 60. Elbow fitting 80 houses barb fitting 82 and is housed in pneumatic air cylinder 84. Fitting pins 86 fit into air cylinder.

FIG. 10 shows an enlarged view of the wand 16. The wand 16 has an inner channel 90 and a support tube 92 both of which engage pivot arm fixture 94. Bearing gear 96 fits into bearing 98 which rests against pulley 100. Pivot arm 94 houses cable guide 102. Coupling 104 secures channel 90 and support tube 92. Probe head 106 houses camera and light assembly (not shown) and secures to inner channel 90 and support tube 92.

FIG. 11 shows a cross-sectional top view of a longitudinal half of a steam generator bisected at the flow slot. Support plate 39 is shown with hundreds of tubes 79 and multiple flowslots 13 passing therethough.

FIG. 12 shows the present invention deployed through access port 5 of generator wall 4. FIG. 12 depicts the present invention in both the horizontal retracted mode (position A) in which it passes through the access port, and the deployed vertical mode (position B). It is understood that for illustrative purposes, the generator is viewed across a longitudinally bisected line in the plane of the device (as shown in FIG. 11) to give a better view of the present invention.

FIG. 13a shows the present invention deployed in the tube lane 81. The device is deployed vertically in the lane through the flowslot 83 in support plate 85. Wand 16 is in the retracted position. FIG. 13b shows wand 16 activated to inspect down the tube column into areas which could not be inspected using past methods and apparatuses. Cables 87 are visible, as are tubes 79, and support plates 85 and 89.

FIG. 14 is a schematic partially exposed view of cable housing 14. Pulley 100 supports cable 220 which wraps about weighted pulley 222. Constant force spring 230 provides balance force to weighted pulley 222.

Figure 15:
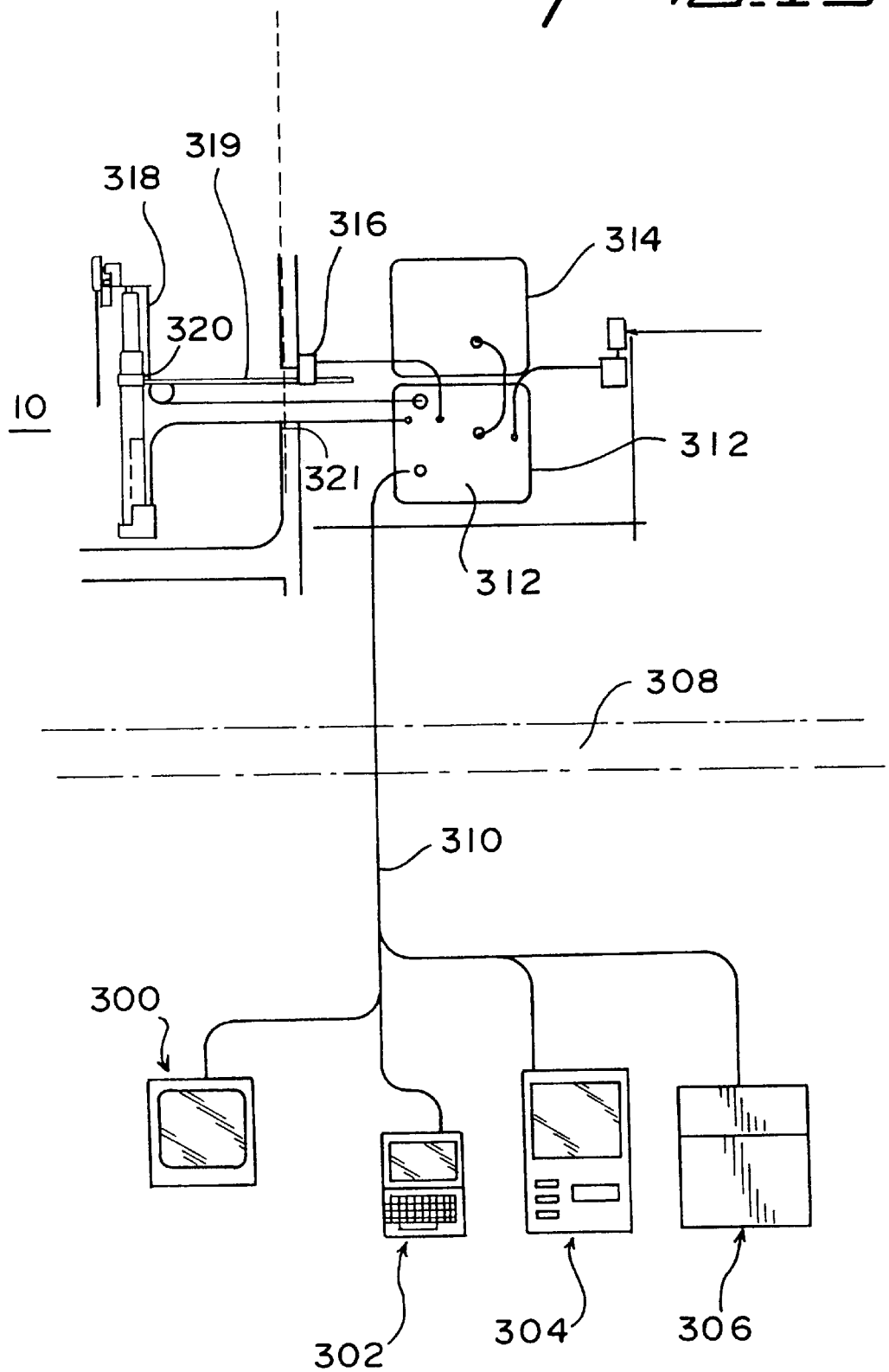
FIG. 15 is a schematic representation of the device of the present invention.

FIG. 15 is a schematic block diagram of the preferred control layout of the present invention. Area monitor 300, control interface computer 302, optional auxiliary electronics 304, and hydraulic pump 306 are preferably positioned outside of a bioshield 308 and have their cables 310 directed to control electronics 312 and power and air supplies 314 which are set up adjacent the generator access opening 321. A rack and pinion drive 316 is attached to rail assembly 319 which is attached to pivot clamp 320 on device 10. Rail assembly 319 supports the device 10 as it is slid into position in the generator.

Figure 16:
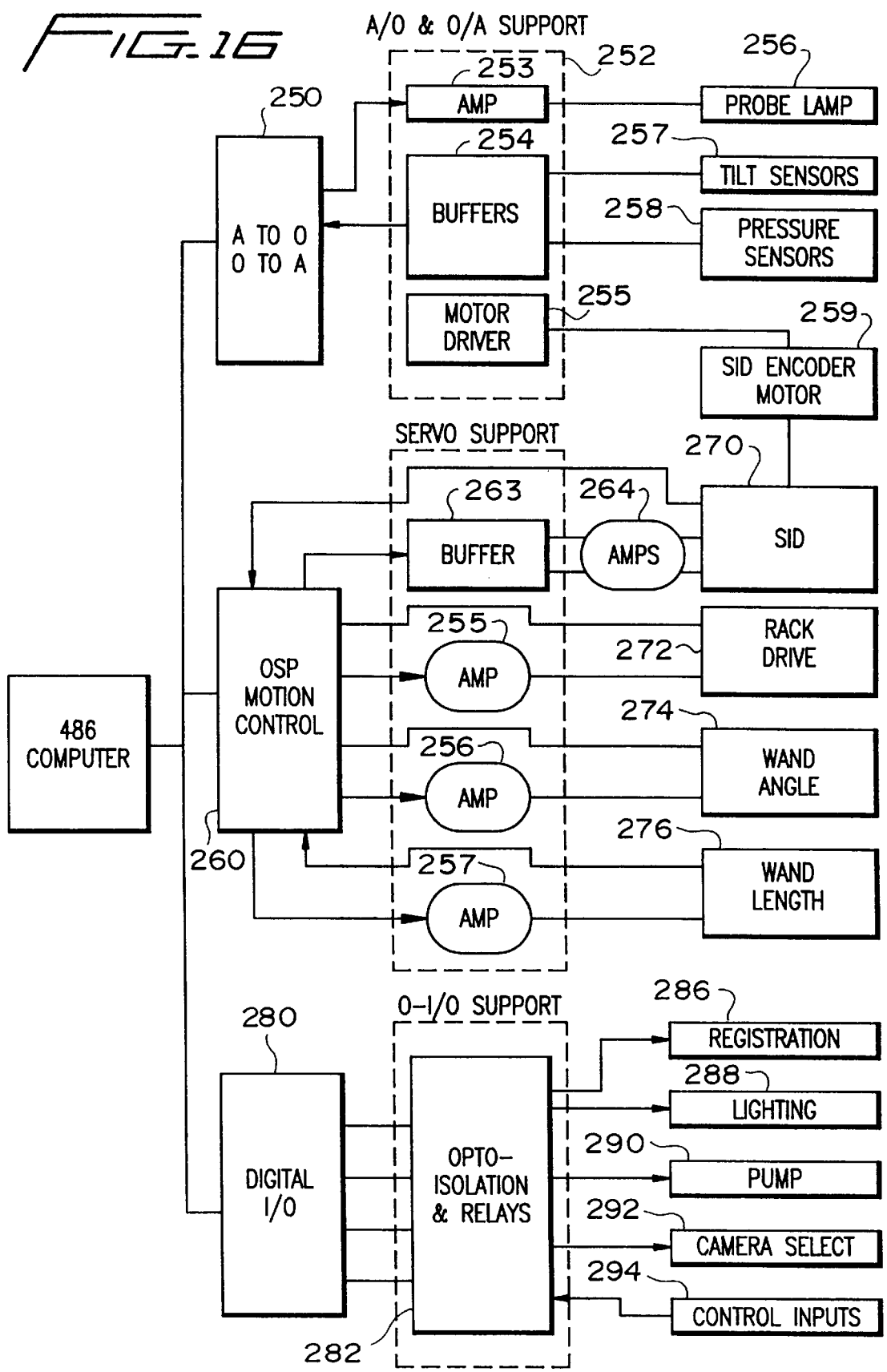
FIG. 16 is a schematic representation of the computer circuitry used to remotely operate the device of the present invention.

FIG. 16 is a schematic representation of the preferred computer interface and circuitry provided to operate remotely the preferred inspection device of the present invention.

FIG. 17 shows a cross-sectional enlarged view of the probe 20 of the wand assembly 16. Camera 400 is shown along with lamp 402, 404 and lamp lenses 406 and 408. FIG. 18 shows an end view 106 of the probe 20.

In operation, the uprighting equipment comprises two major subsystems; the access port mounting equipment and the rail assembly. The access port mounting equipment comprises a backing plate 6, two cam roller support plates and a rack drive servo motor assembly 7. The backing plate 6 completely covers the face of the access port 5 and has slotted mounting holes to allow alignment with the tube lane, and has a relief cut in the backside in the area of the sealing surface of the access port to prevent damage to this surface. Preferably, six 1" diameter cam rollers are mounted on each of two cam roller support plates. These rollers support the first boom rail assembly 2 on all four horizontal edges. The rack drive servo motor 7 is controlled by the operator to precisely position the rail 2 within the steam generator. The rack drive servo motor housing 2 is mounted to one of the roller support plates by a pivot and preferably is held in place by a single locking, quick release pin. The rail can be installed and repositioned by hand by removing the locking pin and swinging the motor assembly up.

The rail assembly 2 comprises two parallel, stainless steel bars, spaced by stainless steel blocks on both ends. For portability and ease of installation the assembly preferably comprises three sections. The primary purpose of the rail is to support and position the telescoping segment's uprighting mechanism, preferably a pivot clamp. Also the rail provides a means of tensioning the uprighting rod using a screw mechanism in the middle section. To move the rack assembly horizontally, a rack is embedded into the top of one of the two parallel stainless steel bars. This rack mates with the pinion on the end of the rack drive servo motor. The three rail assembly sections are joined by guide pins, preferably 1 inch (2.54 cm) in diameter, and preferably are locked together with the thumbscrews. In an alternative embodiment, air fittings for powering the telescoping segment locking pin release cylinder may be embedded into the ends of the sections and must be depressurized before a section can be removed from its mating section. The shaft sections link a removable handle at the end of the rail to the screw used for uprighting the segment.

In one preferred embodiment, the inspection wand is made from thin section telescoping tubing actuated by a stainless steel 4–40 threaded rod driven by a servo motor. The probe head 20 itself, as shown in FIG. 17, preferably is made from an inert polymeric resin material, most preferably Delrin® or Teflon®, and houses the inspection lighting 402 and 404 and camera, which is preferably a CCD camera 400. The inspection probe lighting intensity is set from the remote operator station or from the main control console as would be understood in the field of remote inspection devices.

Figure 19:
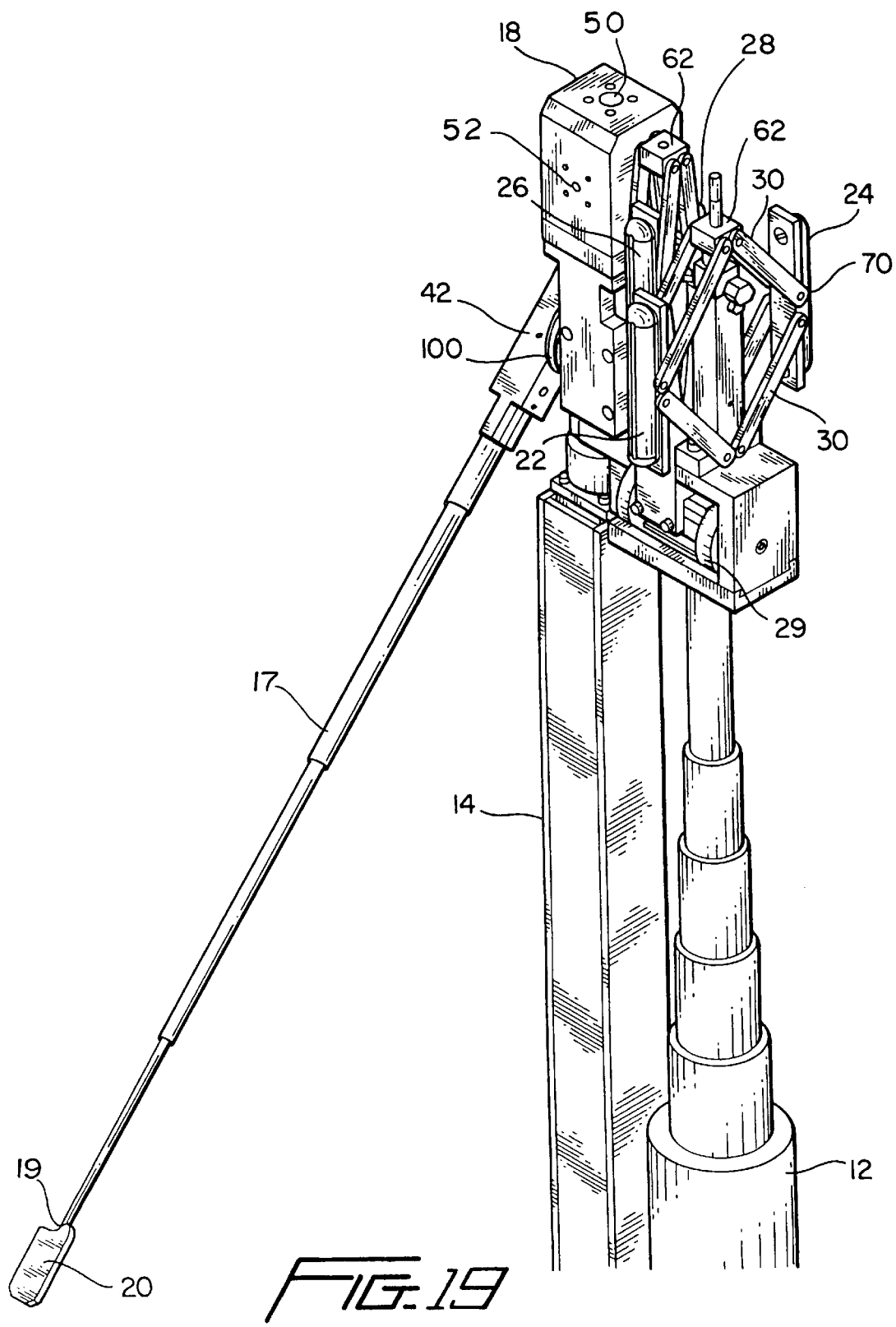
FIG. 19 shows a telescoping wand.

The wand 16 preferably pivots at the distal end of the telescoping segment, or shoulder joint. A set of bevel gears actuated by a servo motor powers the joint. The design of this pivot is such that when the device is de-energized, the motor can be freely back-driven. This safety measure helps to ensure that in the event of a tool failure, the probe can be removed without damaging the steam generator components. In one preferred embodiment, the wand further consists of a double-barrel outside tubular assembly with a double-barrel inside the tubular assembly and an internal screw. The inside assembly can be made to extend from and retract into the outside tubular assembly, making the total wand length shorter or longer as needed for inspection purposes and to negotiate the support plates during deployment into the tube columns. The distal end 19 of the inside tubular assembly attaches to the camera and light assembly probe 20, as shown in FIG. 19. The proximal end of the outside tubular assembly contains the screw (threaded rod), the drive motor, wand camera 40, and attachment shaft for attaching the wand to the head assembly. The attachment shaft rotates to position the wand at the desired angle in the steam generator tube column.

In one preferred embodiment, the registration mechanism may be actuated to move in laterally forward or backward one tube at a time by extending one set of registration guides to an adjacent tube space, releasing the other set of registration guides, and moving the device to align between a new tube column. The registration guides 22, 24, 26, 28 prevent unwanted motion of the head while the inspection wand 16 is positioned between tube columns. The guides 22, 24, 26, 28 align vertically with the steam generator tubes. The guides 22, 24, 26, 28 are actuated by pneumatic air cylinders 29 and fail in the closed position when the device is deenergized. The guides 22, 24, 26, 28 are preferably coated with a material to eliminate the risk of damaging the tubes upon contact. Preferably, the registration guides 22, 24, 26, 28 comprise Delrin® and Teflon® or other highly resilient and adherent protective materials.

An additional air cylinder arranged horizontally moves one registration guide with respect to the other to index the head to a particular column. By cycling the registration and indexing cylinders, the head can be effectively "walked" from one tube column to the next. When a series of several "walking" cycles are combined, the device can move across an entire flowslot width. For example, with reference to FIG. 7, guides 22 and 24 are extended and would contact the hot and cool tubes of a single U-bend tube in a generator. Air cylinder 29 would be activated to move the head 18 a distance sufficient to align guides 26 and 28 with the next tube. Guides 26 and 28 would be pneumatically extended while guides 22 and 24 would be retracted. Air cylinder 29 is again activated to push head 18 "ahead" until guides 22 and 24 are adjacent the next tube, and so forth. As the head is pushed or pulled in a direction along the tube row, an integrated tilt sensor senses that the second telescoping boom is out of verticality. The sensor sends a signal to the servo drive attached to the first boom rail assembly and advances or retracts a distance sufficient to reestablish second boom verticality. To assist in maintaining proper vertical positioning, a dual axis tilt sensor in the base of the telescoping segment provides operator feedback for +/−20 degrees of vertical tilt.

Since the inspection probe is telescopic, a substantial length of cable must be managed and stored within the inspection head. A constant force spring 230 and a set of pulleys 100, 222, as shown in FIG. 14, rising in an enclosed track prevents the inspection camera cabling 220 from becoming tangled and potentially jammed while in operation. This guide also serves to protect the angle joint servo motor and provides a sturdy point to strain relieve the umbilical cable.

The inspection head is linked to the main control console through a multi-function umbilical cable 87 (shown in FIG. 12). This umbilical cable 87 carries all electrical power, control and video signals. It additionally contains four small air lines for the pneumatic components. The primary electrical cable is internally reinforced with Kevlar filler strands for strength; the cable also serving as the emergency retrieval cable.

The additional cameras 50, 52 used are preferably positioned on the head to look up and forward on the probe side. These cameras 50, 52 are used when installing and uprighting the system. These cameras 50, 52 also provide the operator views when traversing flowslots 13 of the support. The lighting and camera operation is preferably controlled by an operator at the computer interface.

In one preferred embodiment, a plurality of proximity sensors, preferably eight, alert the operator to unexpected or undesirable operating conditions and also enable the computer to assume automatic control over the device.

Further, in one preferred embodiment several tapered bumpers, preferably made from or coated with Delrin® help guide the head through the flowslot and ensure that the proximity sensors will be within an acceptable distance from the edge of the flowslot and to sense arrival at the preselected position. Other bumpers also serve to absorb potential impacts with support plates while traversing up through the steam generator.

Due to the sensitive nature of the generators being inspected, the inspection device is preferably made from strong, non-reactive materials. Materials which include chlorides, fluorides and other halogens are inappropriate materials.

The telescoping segment 12 of the present invention is more fully disclosed in commonly assigned U.S. Pat. No. 5,265,129 which is incorporated by reference herein. The segment 12 is a single acting, multi-sectioned telescopic cylinder, designed to deliver inspection head 20 and wand 16 through the flowslot openings in the generator. The segment 12 preferably uses hydraulic pressure as the motive force. The tubes preferably are made from stainless steel. Bronze bushings and aluminum pistons create the bearing surfaces for side loads with two cup seals present on each piston to limit fluid loss. Demineralized water is the preferred fluid, with the preferred maximum operating pressure being approximately 120 psi. The extended height of the tool may be measured by known gauges, but is preferably measured by a string wound take-up spool within the base of the telescoping segment. String tension is maintained by means of the torque supplied by an electric motor linked to the take-up spool via a set of spur gears. A magnetic rotary encoder 259 spinning on an axis common to the motor shaft provides quadrature output, which provides the feedback to a digital servo loop. The motor drive circuitry resides within the drive electronics 252 to limit motor current, thus preventing overheating and potential failure as would be understood by one skilled in the field.

The distance the device moves, tube 79 column to tube column 79, down the tube lane within the generator is carefully calibrated such that, as the head of the device with the finger-like projections engages the tubes, the precise location of the device and the exact tube column being inspected is known with certainty. The inspection device, therefore may be made to move across the tube lanes 81 tube by tube if desired. The mechanism is preferably driven and computer controlled, and designed to step one tube at a time on command if desired, and send and receive positioning information allowing an operator to precisely and reliably know the precise area of the generator being inspected. The specially designed registration fingers or guides are made from materials which will not damage the tubes or any of the internal parts of the steam generator, but will also be durable enough to survive the harsh conditions. Preferable bumper materials include Teflon®, and Delrin®. The guides are kept in place using either diverted pressure or spring tension from springs in the event air pressure is lost. A plurality of guides may be used, with two sets of positioning guides used on each side of the device head being particularly preferred. As mentioned above, the mounting rail can be made to automatically position the base of the device to maintain its vertical position to the next tube row.

When the vertical telescoping assembly is mechanically raised to the predetermined desired location, an inspection wand 16 or arm is swung away from the body of the vertical structure perpendicular to the first boom 12 and rail assembly and at a progressive angle until the arm is positioned at a desired location between the desired tube columns, and at a desired specified height between said tube columns, as shown in FIG. 3. Preferably, the camera head comprises at least one radiation tolerant charge coupled device (CCD) color video camera. The camera preferably is fixed focus and is remotely computer controlled with the necessary circuitry and supporting wires and cables to receive positioning instructions, and to send back to the control station, and other various displays, transmissions from the camera in the form of pictures and location information, as would be readily understood by one skilled in the field of microcameras, robotics and circuitry. Therefore the system is controlled remotely by the computer once it is installed. The control station has the capability to record the output of the cameras on a VCR or other monitor. The device functions may be controlled by commands which may be given on even a lap top-type computer as would be readily understood by one skilled in the field. The operator interface provides information to the operator such as wand position, device height, registration position, tilt angle, tube row and column being viewed, as well as a number of other functions as may be desired.

As mentioned above, the wand additionally is able to extend to a predetermined position on command by extending the wand length 276 in yet another telescoping fashion via a telescoping mechanism. In this way, the wand 17 and probe head 20 can move into any desired position in the steam generator (e.g. into the tube lanes, into the tube bundles between tube columns, beneath and above support plates, etc.) by combining the movements of the vertical telescoping boom 12 and the telescoping movements of the wand 17. The upper wand camera 40, near the wand pivot point, further allows the operator to view down the length of the wand as it is deployed. This feature allows the operator a view of the operation of the wand 16, as well as a view of the condition of the generator interior.

Therefore the device of the present invention can deliver status updates of the generator inspection to an operator in numerical and graphical form if desired; specifically relaying precise probe location (probe is the housing containing the camera and lights at the distal end of the wand) such as support plate level, tube row, tube column, joint value, etc. In addition tilt sensor readings, proximity sensor readings, air and hydraulic pressure readings and registration guide condition can all be delivered to the operator and optionally recorded via the attached supporting computer 240.

Once installed, all mechanical operations of the device of the present invention may be manually or automatically power driven through electric and pneumatic controls with the video inspection accomplished using high resolution miniature cameras with complementary lighting devices. In operation, system commands are relayed by the operator via the computer to give absolute, relative and jog commands for individual points. Further, automatic commands may be computer programmed to carry out a specific inspection sequence, giving automatic sequences to position the probe. As mentioned above, additional cameras 50, 52 can be positioned about the inspection device, some cameras carrying the wand and probe head in the field of view, to have a view of the device itself within the generator. Programs can be provided to the computer to allow for sophisticated camera switching at any desired time to deliver images to selected monitors as desired. It is understood that useful computer programs can be written and implemented to control the present device and to prevent the operator from inadvertently entering any commands which could damage the probe or the entire inspection device. Of course such safety measures could be written to be overridden in an emergency.

Preferably, the control hardware for the present invention can be divided into primary control hardware and operator station hardware. The primary control hardware is set up at the steam generator platform and comprises two small suitcase-sized cases 312, 314 in FIG. 15. One case contains the main control console 312 and the second case 314 contains bulk power supplies. Plant supplied AC power and compressed air are required to be supplied to these cases for system operation.

A switching-type power supply provides power to sensitive computer hardware from the main control console case. The main control console 302 provides the system manual control capability. Power for motor loads, lighting, cameras and support circuitry is supplied by the bulk power supply case 314. All system component connections terminate at the main control console 302.

The operator station for the device preferably contains a control computer 302, running a Microsoft Windows based graphical user interface, associated control hardware 304, video monitoring 300 and recording equipment and audio communication equipment. In one preferred embodiment, audio communications link the steam generator platform and the operator station to assist in setup and installation. The control computer preferably is a PC/104, standard 80486, 25 MHz, PC compatible microprocessor. In one preferred embodiment, distributed off the common PC/104 bus are three additional devices; 1) a Win Systems 48 channel digital I/O 280, 2) a Win Systems analog I/O 250 providing eight 12 bit analog inputs and two 12 bit outputs and 3) a Motion Engineering 32 bit 4 axis motion controller 260. Three custom designed printed circuit boards interface each of these devices with associated components. The remaining applications to run the present system would be readily understood by one skilled in the field of remote inspection equipment. See FIG. 16 for the computer block diagram outlining one particularly preferred design.

FIG. 16 shows a computer interface for remote operation. A sensor reading and lamp powering device 250 provides power to a probe lamp 256 through an amplifier 253 in the support electronics 252. The output of sensors, such as tilt sensors 257 and pressure sensors 258, are buffered by buffers 254 and read by the sensor reading and lamp powering device 250. The support electronics 252 also contain a motor driver 255 to run the encoder motor 259. The encoder's input 270 passes through amplifier 264 and buffer 263 from the motion controller 260. Feedback is provided by the encoder 270 to the motion controller 260. The motion controller 260 receives feedback from the rack drive 272, the wand angle 274, and the wand length 276 and provides control signals through corresponding amplifiers 265, 266, and 267. A digital I/O controller 280 through optical isolators and relay electronics 282 in the I/O support electronics 282 provide control signals to the registration guides 286, the lighting 288, the pumps 290, and the cameras 292 and receives control inputs 294. Interconnecting cable 242 connects the computer 240 with the analog sensor reading/lamp power/motor driver device 250, the motion controller 260, and the digital I/O controller 280.

The working mechanism for the wand 16 of the present invention may be powered, hydraulically, pneumatically, etc., with a pneumatically controlled design being particularly preferred.

The preferred hydraulic pump assembly 306 for the telescoping (second) boom of the present invention comprises a centrifugal vane pump, pressure relief valve, two proportional control valves, a solenoid block valve, a fluid reservoir and pressure gauges. Control power and signals are fed from the main control console 302 over a single cable and main 110V AC power to operate the pump 306 is obtained from a source local to the pump.

As mentioned earlier, retrieval of the extended inspection device from the generator is a contingency which must be planned for in the event of a partial or complete system malfunction. The present invention depends upon gravity for retraction, and includes an emergency cable (the electrical and pneumatic cable bundle covered with a Kevlar sheath) to serve as a contingency recovery method. The cable 87 is securely attached within the head of the unit and extends the length of the device and out the access port 5. Therefore, the device can be forcibly extracted from the generator by lowering the device and retrieving the device with no lost parts from the device left in the generator after removal is complete. For example, use of exposed screws is avoided. When screws must be present they have retainer clips or safety wires attached. Where screws must be used it is preferable to recess the screws and fill the holes with a suitable filler to lock in the screws. Preferably, the emergency removal can be accomplished whether or not the wand 16 or 17 is in its extended position.

Any workable camera may be used in connection with the present invention inspection device. Preferred devices are the charge coupled device (CCD) video cameras, for example as described in U.S. Pat. No. 5,265,129 which is incorporated by reference herein. The range of camera view can be increased to desired specifications by patching multiple cameras to the camera head on the wand 16 and elsewhere throughout the device including on the telescoping stem such that every aspect of the device can be viewed on the monitors. The materials selected for the device including the camera housings must be able to withstand harsh environmental conditions. It is understood that the camera will withstand excessive temperatures of at least about 50° C., and may include passive or active cooling means. The probe camera cable system is preferably completely encased in a housing along the wand, preferably having constant cable tension during probe (wand) retraction. The cameras, according to one preferred embodiment, and as shown in the drawings, are preferably integrated into the wand along with the required lighting units as part of the camera structure. Preferred cameras are modified Toshiba QN401E ¼" cameras, although other CCD cameras may be modified for use with the present invention as would be understood by one skilled in the electronics field.

The primary function of the probe 20 is to house the cameras 400 along with supporting lighting fixtures 402, 404. The primary function of the wand 16 or 17 is to position the camera 400 for inspection. The wand 16 or 17 is preferably telescoping and wired to a computer to send and receive information for proper positioning. The wand preferably has an electromagnetic clutch attached to a de-couple drive, but could use any drive mechanism that can reliably move and position the wand as would be understood to one skilled in the field of drive mechanics.

The device of the present invention will facilitate inspection of any closed vessel where maneuverability is critical and hard-to reach areas requiring visual inspection are required to keep the vessel in service.

The entire device is designed to be a non-invasive device in the unlikely event of malfunction where careful retrieval and complete device removal would be required.

As already mentioned, an in-bundle probe delivers the camera to the desired tube row with the device having at least one rotating joint and at least one telescoping vertical and at least one horizontal member.

Many other modifications and variations of the present invention are possible to the skilled practitioner in the field in light of the teachings herein. It is therefore understood that, within the scope of the claims, the present invention can be practiced other than as herein specifically described.

What is claimed:

1. A device for inspecting the interior of a steam generator, comprising:
    a first boom;
    a second boom having a first end pivotally attached to the first boom and a second end;
    a head assembly attached to the second end;
    registration guides mounted to the head assembly which extend away from and retract to the head assembly, the registration guides sized and configured to press against tubes of the steam generator in an extended position;
    a drive assembly attached to the head assembly; and
    a movable sensing wand attached to the drive assembly at a proximal end and having a sensor probe at a distal end, the sensor probe comprising a light source and a camera.

2. The device according to claim 1, comprising a pneumatic actuator for extending and retracting the registration guides.

3. The device according to claim 1, wherein the second boom comprises a telescoping boom.

4. The device according to claim 1, wherein the sensing wand comprises a telescoping wand.

5. The device according to claim 1, further comprising additional cameras.

6. The device according to claim 2, wherein the registration guides comprise a plurality of pneumatic actuators.

7. The device according to claim 1, wherein the head assembly comprises at least one additional sensor for measuring relative position.

8. The device according to claim 7, wherein the sensor comprises a counter.

9. The device according to claim 1, wherein the first boom comprises a pivoting means for engaging the second boom.

10. A method for inspecting the interior of a steam generator comprising:
    providing an inspection device comprising a first boom, a second boom having a first end pivotally attached to the first boom and a second end, a head assembly attached to the second end, a drive assembly attached to the head assembly, and a movable sensing wand attached to a drive mechanism in the head assembly at a proximal end and having a sensor at a distal end;
    inserting the inspection device through an access port in the generator;
    positioning the first boom and the second boom in the tube lane perpendicular to the tube rows;
    uprighting the inspection device within the generator in the tube lane to a position generally parallel to the tube rows;

locating the device at a predetermined location;

extending registration guides away from the head assembly against adjacent tubes, each of the registration guides having a major length which is aligned in parallel with the longitudinal axes of the adjacent tubes of the steam generator;

moving the wand to position the sensor at a desired location;

illuminating from the distal end of the wand; and recording and displaying visual images at a display located remotely from the device.

11. The method according to claim 10, further comprising pneumatically actuating the registration guides.

12. The method according to claim 10, further comprising feeding positioning data from the registration guides such that the precise location of the device within the generator is known.

13. A device for inspecting the interior of a steam generator, comprising:

a first boom;

a second boom having a first end pivotally attached to the first boom and a second end;

a head assembly attached to the second end;

a drive assembly attached to the head assembly;

a plurality of pneumatically actuated registration guides attached to the head assembly, the registration guides having a major length which is aligned in parallel with longitudinal axes of the steam generator tubes, the registration guides sized and configured to press against the steam generator tubes in an extended position so as to stabilize the head assembly, the registration guides being coated so as to prevent damage to the steam generator tubes; and a movable sensing wand attached to the drive assembly at a proximal end and having a sensor probe at a distal end, the sensor probe comprising a light source and a camera.

14. The device of claim 13, the light source comprising two lamps.

15. The device of claim 13, the plurality of pneumatically actuated registration guides comprising two pairs of registration guides which are alternately actuated.

16. The device of claim 13, where the sensing wand is a telescoping wand.

17. The device of claim 13, further comprising a tilt sensor, a proximity sensor, an air pressure sensor, and a hydraulic sensor.

18. The device of claim 14, wherein the camera is located between the two lamps.

19. A device for inspecting the interior of a steam generator, comprising a first boom;

a second boom having a first end pivotally attached to the first boom and a second end;

a head assembly attached to the second end;

a plurality of registration guides attached to the head assembly, the registration guides having a major length oriented so as to be in alignment with the longitudinal axes of tubes of the steam generator, the registration guide being sized and configured to press against the steam generator tubes in an extended position;

a drive assembly attached to the head assembly; and a telescopingly extendible sensing wand attached to the drive assembly at a proximal end and having a sensor probe at a distal end.

20. The device of claim 19, wherein the registration guides are pneumatically actuated.

21. The device of claim 19, wherein the sensing wand is a pivotable wand.

22. The device for inspecting the interior of a steam generator, comprising:

a first boom;

a second boom having a first end pivotally attached to the first boom and a second end;

a head assembly attached to the second end;

a plurality of registration guides attached to the head assembly, the registration guides having a major length oriented so as to be in alignment with the longitudinal axes of tubes of the steam generator, wherein the registration guides include two pairs of registration guides which are alternately actuated;

a drive assembly attached to the head assembly; and a telescopingly extending sensing wand attached to the drive assembly at a proximal end and having a sensor probe at a distal end.

23. The device of claim 22, wherein the registration guides extend away from the head assembly and retract toward the head assembly.

* * * * *